US012112730B1

(12) United States Patent
Wherry

(10) Patent No.: US 12,112,730 B1
(45) Date of Patent: Oct. 8, 2024

(54) LIGATURE FOR MUSICAL INSTRUMENT

(71) Applicant: Bradley V Wherry, Federal Way, WA (US)

(72) Inventor: Bradley V Wherry, Federal Way, WA (US)

( * ) Notice: Subject to any disclaimer, the term of this patent is extended or adjusted under 35 U.S.C. 154(b) by 0 days.

(21) Appl. No.: 18/641,092

(22) Filed: Apr. 19, 2024

(51) Int. Cl.
*G10D 9/025* (2020.01)

(52) U.S. Cl.
CPC .................................... *G10D 9/025* (2020.02)

(58) Field of Classification Search
CPC ...................................................... G10D 9/025
See application file for complete search history.

(56) References Cited

U.S. PATENT DOCUMENTS 4,517,875 A * 5/1985 Dossekker ............... G10D 7/06 84/383 R
4,596,175 A * 6/1986 Dossekker ............... G10D 7/06 84/383 R
7,638,700 B1 * 12/2009 Heintz ..................... G10D 7/06 84/383 A
9,940,913 B1 4/2018 Harrison
11,538,447 B2 12/2022 Wanne
2008/0083316 A1 * 4/2008 Wanne ..................... G10D 9/02 84/398
2013/0239775 A1 * 9/2013 Spears ..................... G10D 7/06 84/383 R
2019/0005926 A1 1/2019 Mure

* cited by examiner

*Primary Examiner* — Robert W Horn

(74) *Attorney, Agent, or Firm* — Plager Schack LLP; Mark H. Plager, Esq.; Naomi Mann, Esq.

(57) ABSTRACT

A ligature for attaching a reed to a mouthpiece of a musical instrument comprises an attachment base configured to attach to the mouthpiece shank while essentially avoiding contact with the mouthpiece main body, and a lever arm system including a lever coupled to the attachment base and configured to press against an inner section within the front surface of the reed when the ligature is attached to the mouthpiece.

10 Claims, 3 Drawing Sheets

LIGATURE FOR MUSICAL INSTRUMENT

BACKGROUND

The present disclosure relates generally to musical instrument systems and accessory devices.

Ligatures are used to hold a reed to the mouthpiece of woodwinds such as saxophones and clarinets. Conventional ligatures may contact the body of the mouthpiece and/or the edges/side surfaces of the reed, which may result in dampened vibration. As such, an improved ligature system is desirable.

SUMMARY

According to various embodiments, disclosed is a ligature and ligature system for securing a reed to a mouthpiece of a musical instrument, which minimizes vibrational interference. In embodiments, the mouthpiece may comprise a mouthpiece shank and a mouthpiece main body extending frontwards from the mouthpiece shank. The reed may include a front surface outlined by front surface edges, a rear surface opposite the front surface and outlined by rear surface edges, and side surfaces extending continuously between the front surface edges and the rear surface edges. The disclosed ligature essentially avoids direct contact with the mouthpiece main body, and with the front surface edges, the rear surface edges, and the side surfaces of the reed when used to secure the reed to the mouthpiece. In some embodiments, the ligature may comprise an attachment base configured to attach to the mouthpiece shank while essentially avoiding contact with the mouthpiece main body, and a lever arm system including a lever coupled to the attachment base and configured to pivot. In some embodiments, the lever includes an elongated body with a first end region proximate the attachment base and a second end region opposite the first end region, the elongated body extending frontwards from the first end region such that the second end region is configured to press against an inner section within the front surface of the reed when the ligature is attached to the mouthpiece and when the lever is pivoted in a first direction, the reed being positioned within a reed receiving section of the mouthpiece main body and with the rear surface of the reed contacting the reed receiving section. In further embodiments, the ligature may comprise a reed contact element at the second end region of the lever. In certain embodiments, the reed contact element comprises a plate which is pivotally coupled to the lever. In further embodiments, the reed contact plate comprise a flat contact surface configured to press flush against the front surface of the reed. In some embodiments, the lever is configured to pivot about an intermediate point of the lever, the intermediate point being located between the first end region and the second end region of the lever. In some embodiments, the attachment base supports a pair of congruent pivot arms that extend from opposite sides of the attachment base and towards the mouthpiece main body when the ligature is attached to the mouthpiece, the pivot arms further supporting a pivot bar on which the lever pivots. In certain embodiments, the attachment base comprises a ring configured to fit around the mouthpiece shank, the pivot arms being coupled to opposite sides of the ring. In some embodiments, the ligature further comprises a lever positioning assembly configured to adjust and affix the position of the lever. In some embodiments, the lever positioning assembly comprising a screw threadably engaged within a threaded hole provided in the first end region of the lever, and a screw receiving surface provided in the attachment base, the screw receiving surface being configured to receive a bottom end of the screw and to prevent translation motion of the screw as the screw is rotated within the threaded hole, such that a rotational motion of the screw causes the lever to pivot. In some embodiments, the attachment base comprises a ring configured to fit around the mouthpiece shank.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
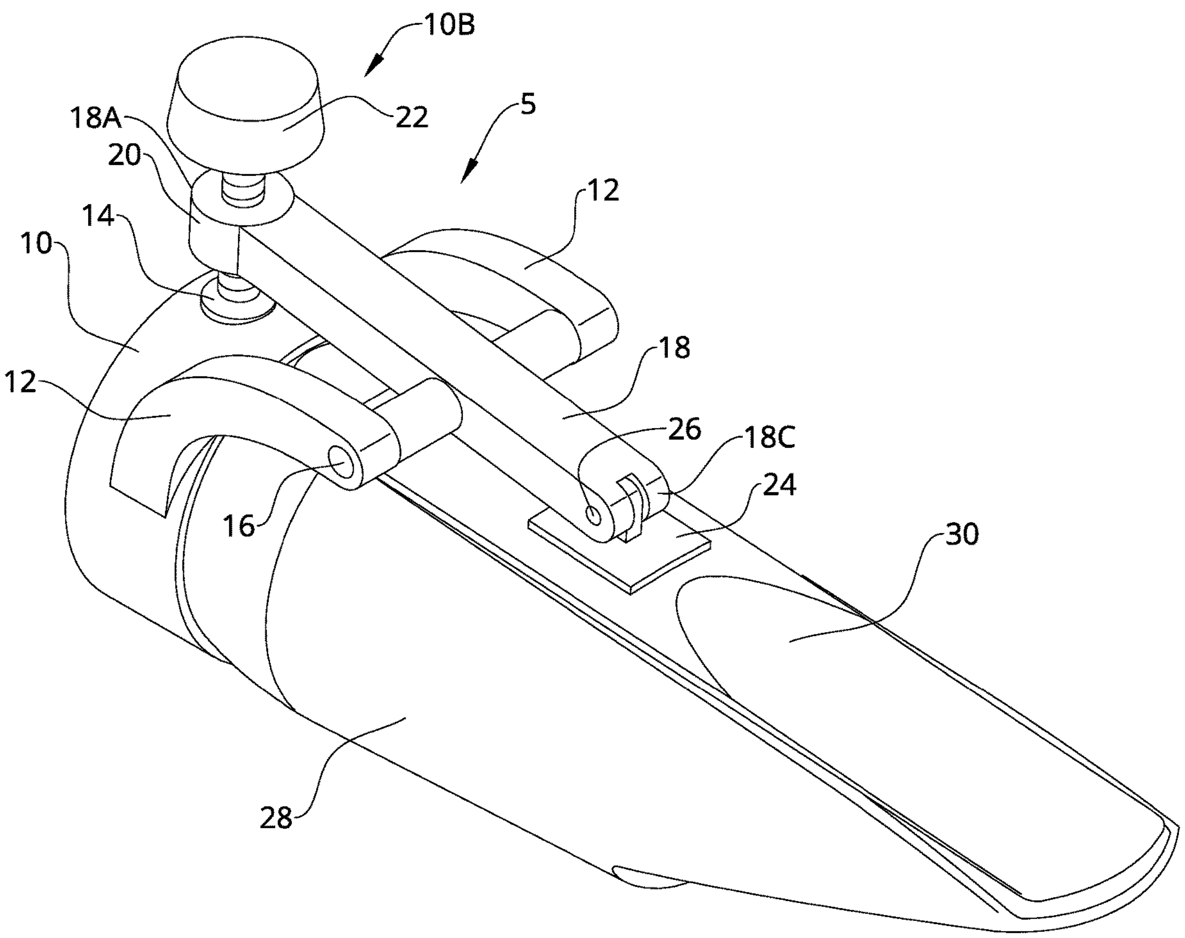
FIG. 1 is a perspective view of a ligature in use for holding a reed to a mouthpiece of a musical instrument.
Figure 2:
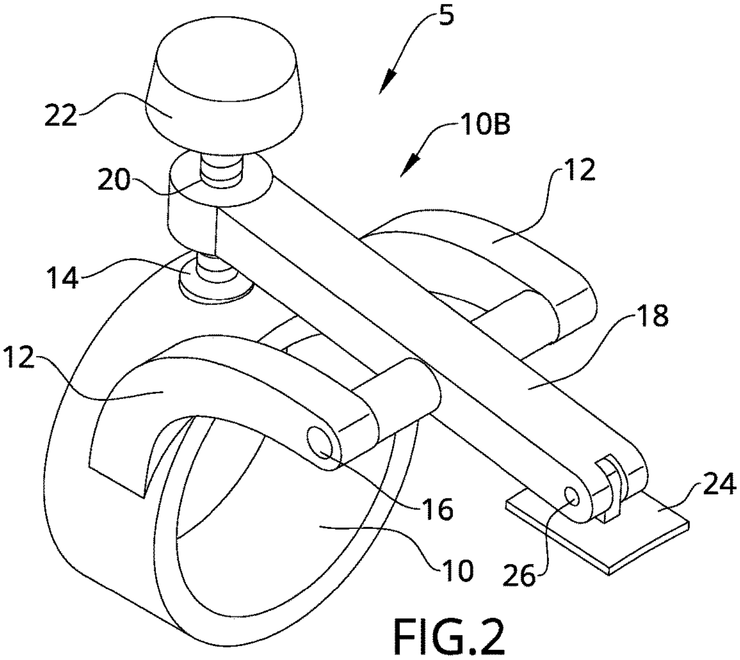
FIG. 2 is a perspective view of the ligature.
Figure 3:
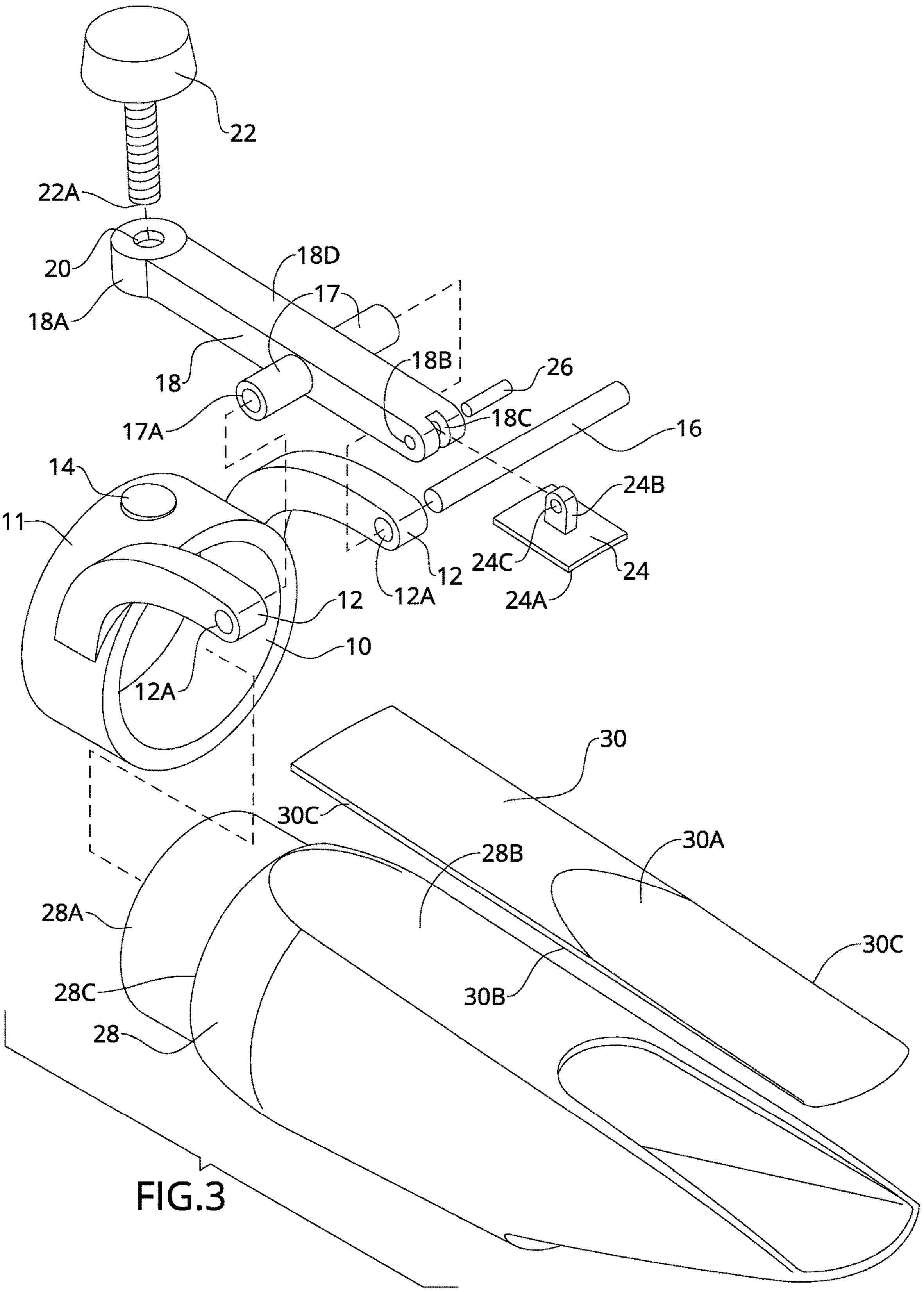
FIG. 3 is an exploded view of the ligature.
Figure 4:
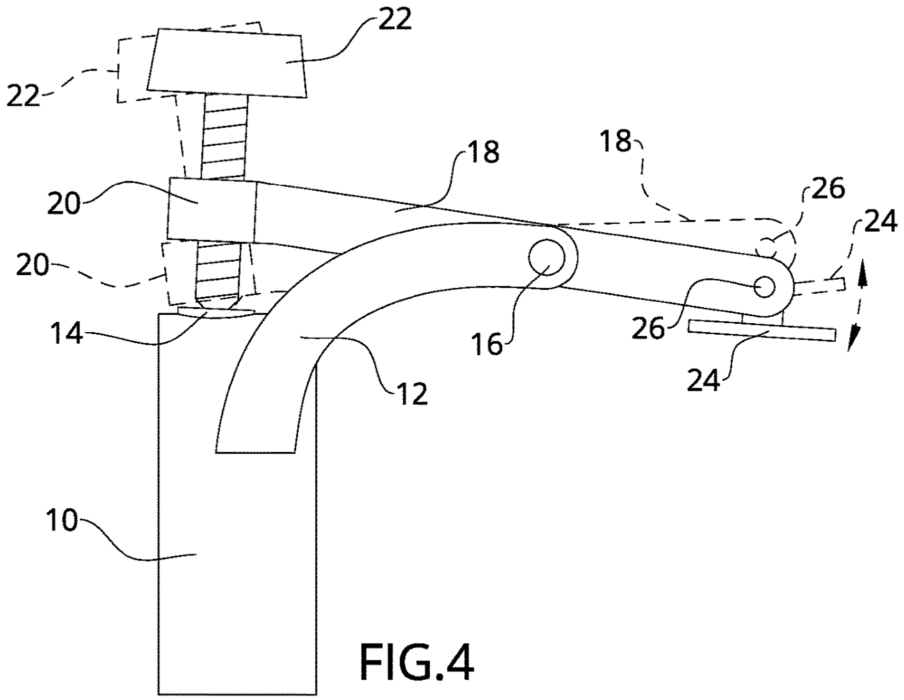
FIG. 4 is a side view thereof.
Figure 5:
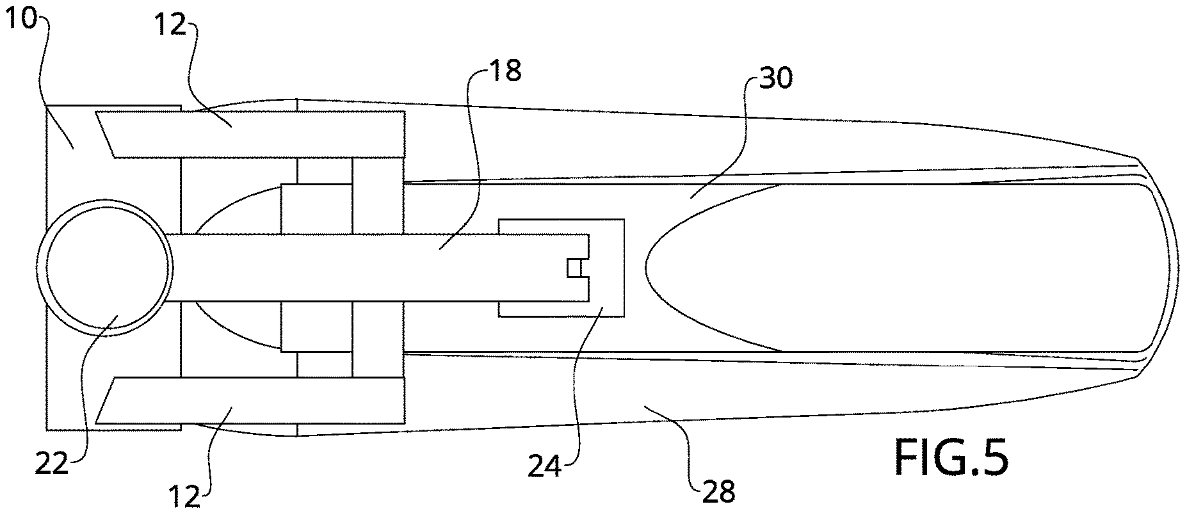
FIG. 5 is a top view of the ligature in use.

According to various embodiments as depicted in FIGS. 1-5 disclosed is a ligature 5 for securing a reed 30 to a mouthpiece 28 of a musical instrument. In embodiments, the instrument may be a single-reed woodwind such as a saxophone, clarinet, tarogato, etc., but is not limited to these options. As is known, mouthpiece 28 may generally comprise a shank 28A (also known as a base or barrel) supporting a mouthpiece main body 28B. Mouthpiece main body 28B includes a reed receiving section (typically a flat section also known as a table), against which the reed is secured. Reed 30 may comprise a generally flat body, including a front surface 30A outlined by front surface side edges, a rear surface 30B outlined by rear surface side edges, and side surfaces 30C extending continuously between the front surface side edges and the rear surface side edges.

In certain embodiments, ligature 5 may comprise an attachment base 10 configured to attach to mouthpiece shank 28A rather than its main body. Attachment base 10 pivotally supports a lever arm system 10A configured to press reed 30 against mouthpiece 28 by contacting the front surface 30A of the reed, and thus avoiding contact with side surfaces 30C including outlining side edges of the front and rear surfaces. Thus, ligature 5 secures reed 30 to mouthpiece 28, in a manner which essentially avoids contact with mouthpiece main body 28B and side surfaces 30C including edges of the reed for significantly reduced dampening. It is noted that in some embodiments, there may be incidental contact between the attachment base 10 and transitional edges 28C of the mouthpiece and/or bottom portion of main body 28B. While such contact is preferably avoided, it is nevertheless non-essential.

In certain embodiments, attachment base 10 may comprise a retaining ring 11 configured to receive shank 28A and to securely hold ligature 5 to mouthpiece 28. In some embodiments, ring 11 may be configured to friction fit around shank 28A. In certain embodiments, lever arm system 10A may comprise a lever 18 which is pivotally coupled to retaining ring 11. Lever 18 may generally comprise an elongated body, having first end region 18A (also referred to as "first end 18A") and a second end region 18C (also referred to as "second end 18C") opposite the first end region. As depicted in the figures, lever 18 generally extends in the same longitudinal direction as the reed 30 and/or mouthpiece 28 when ligature 5 is attached (it shall be understood that the phrase "in the same longitudinal direction" as used herein, does not imply a necessarily parallel alignment, as the lever is configured to tilt). In certain embodiments, second end region 18C is configured to press against front surface 30A of reed 30 as it is pivoted towards reed 30. In some embodiments, second end 18C of lever 18 may include a reed contact element 24 configured to press against an inner point and/or section within the front surface of the reed that is removed from the side edges outlining the front surface.

In some embodiments, reed contact element 24 may comprise a plate having a flat contact surface 24A configured to press flush against front surface 30A. In certain embodiments, reed contact element 24 (also referred to as "reed contact plate 24") may contact a central and/or nodal section of reed 30, but not necessarily so. In some embodiments, reed contact plate 24 may be pivotally coupled to second end 18C. In one embodiment, reed contact plate 24 may include a pivot connection member 24B opposite flat contact surface 24A. In certain embodiments, pivot connection member 24B includes a through hole 24C configured to receive a reed plate connection pin 26 engaged through connection pin receiving holes 18B provided at second end 18C of the lever. In certain embodiments, reed contact plate 24 may have a rectangular shape as illustrated, but not necessarily so. It shall be appreciated that reed contact element 24 may be an integral component of lever 18 in alternate embodiments. For example, second end 18C may be rounded/cylindrical so as impart a perpendicular contact force at any point of contact in alternate embodiments.

In certain embodiments, lever 18 may be configured to pivot about an intermediate point 18D between first and second ends 18A, 18C. It shall be understood that intermediate point 18D may be, but is not necessarily central. In one embodiment, a pair of congruent pivot arms 12 may extend upwards and frontwards from opposite sides of retaining ring 11 and are configured to retain a pivot bar 16 which pivotally supports lever 18 at intermediate point 18D. In one embodiment, pivot arms 12 are each attached at their base ends to the sides of ring 11, and include corresponding holes 12A at their distal ends. Holes 12A are traversely aligned so as to support pivot bar 16 in cross alignment to mouthpiece 28 when ligature 5 is attached thereto. In certain embodiments, pivot bar 16 is engaged through a lever through hole (not shown) provided at intermediate point 18D. In some embodiments, the lever through hole may be flanked by a pair of tubular spacers 17 including spacer through holes 17A which extend continuously with the lever through hole. Thus, pivot bar 16 runs through the holes 12A, the lever through hole, and spacer through holes 17A to pivotally couple lever 18 to ring 11 via pivot arms 12.

In further embodiments, lever arm system 10A comprises a lever positioning assembly 10B configured to allow a user to adjust and affix the position of lever 18 against reed 30. In certain embodiments, lever positioning assembly 10B may comprise a tightening screw 22 and a threaded hole 20 within first end 18A of lever 18. In certain embodiments, screw 22 may be a thumb screw which is easy to grip and handle for user friendliness. In some embodiments, first end 18A may have a circular shape, as shown, in conformity to the head of tightening screw 22. In further embodiments, positioning assembly 10B includes a screw receiving surface or stop pad 14 provided at a top section of ring 11 and is configured to receive a bottom end 22A of tightening screw 22 when tightening screw 22 is threadably engaged within hole 20. Screw receiving stop pad 14 prevents translational motion of the screw, thus affixing its vertical position while allowing it to rotate within threaded hole 20. In some embodiments, screw receiving stop pad 14 may be circular and/or correspond to the shape of first end 18A, but not necessarily so. As the vertical position of screw 22 is affixed, rotating screw 22 causes first end 18A of lever 18 to move vertically upwards or downwards (depending on the direction of rotation), allowing a user to tighten or loosen the hold force of reed contact plate 24 against reed 30. Specifically, moving first end 18A vertically upwards (away from stop pad 14) increases the pressure of contact plate 24 against reed 30 to tighten the hold force; conversely, moving first end 18A vertically upwards (towards stop pad 14) decreases the pressure of contact plate to loosen the hold force against reed 30. As contact plate 24 is pivotally coupled to the lever, its position adjusts to lay flush against the reed as it presses against the reed.

In embodiments, a user/woodwind instrument player may attach ligature 5 to the base of his/her mouthpiece, or in the case of a clarinet or tarogato, to the barrel. The player may then place a reed on the mouthpiece main body and then turn the tightening screw of the ligature until the reed contact plate presses with sufficient force to hold the reed to the mouthpiece. As the ligature avoids contact with the mouthpiece body and sides of the reed, dampening of the reed vibration is minimize with more mechanical energy converted into acoustical energy for optimal response to the player.

Thus, the disclosed subject matter provides a ligature comprising an attachment base which attaches to the shank of a mouthpiece and fixes the reed to the face of the mouthpiece via a lever system that is tightened and locked into position at the attachment base of the ligature or shank of the mouthpiece. The ligature avoids contact with the side surfaces and edges of the reed and the mouthpiece main body to minimize vibrational interference. In certain embodiments, the components of ligature 5 may be made from milled or cast brass or other metal which may be brazed together to assemble the ligature. It shall be appreciated, however, that ligature 5 may comprise any alternative materials and may be manufactured and assembled using any known techniques in the field.

It shall be appreciated that the disclosed device and system can have multiple configurations in different embodiments. For example, attachment base 10 may comprise different attachment elements, such as various clamps, brackets, etc., instead of ring 11, for attaching ligature 5 to mouthpiece shank 28A in alternate embodiments. As another example, while pivot arms are depicted as arcuate in the figures, different geometric profiles, including straight vertical and horizontal stepped sections, may be used in alternate embodiments. Additionally, it shall be appreciated that different connection elements, for attachment and/or pivotally coupling the various components described herein may be used in alternate embodiments. It shall be appreciated that the device and system described herein may comprise any alternative known materials in the field and be of any color, size, and/or dimensions. It shall be appreciated that the device may be manufactured and assembled using any known techniques in the field.

As used herein, terms such as "side surfaces" and "side edges" in reference to reed 30, encompasses any continuous side surface or edge (as may be the case with an oval or circular reed). It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A ligature for securing a reed to a mouthpiece of a musical instrument, the mouthpiece comprising a mouthpiece shank and a mouthpiece main body extending frontwards from the mouthpiece shank, the reed including a front surface outlined by front surface edges, a rear surface opposite the front surface and outlined by rear surface edges, and side surfaces extending continuously between the front surface edges and rear surface edges, the ligature comprising:

an attachment base configured to attach to the mouthpiece shank, a lever arm system including a lever coupled to the attachment base and configured to pivot, the lever comprising an elongated body with a first end region proximate the attachment base and a second end region opposite the first end region, the elongated body extending frontwards from the first end region such that the second end region is configured to press against an inner section within the front surface of the reed when the ligature is attached to the mouthpiece and when the lever is pivoted in a first direction, the reed being positioned within a reed receiving section of the mouthpiece main body and with the rear surface of the reed contacting the reed receiving section, wherein the ligature is configured to essentially avoid direct contact with the mouthpiece main body, and with the front surface edges, the rear surface edges, and the side surfaces of the reed when the ligature is used to secure the reed to the mouthpiece.

2. The ligature of claim 1, further comprising a reed contact element at the second end region of the lever.

3. The ligature of claim 2, wherein the reed contact element comprises a plate which is pivotally coupled to the lever.

4. The ligature of claim 3, wherein the reed contact plate comprise a flat contact surface configured to press flush against the front surface of the reed.

5. The ligature of claim 2, wherein the lever is configured to pivot about an intermediate point of the lever, the intermediate point being located between the first end region and the second end region of the lever.

6. The ligature of claim 5, wherein the attachment base supports a pair of congruent pivot arms that extend from opposite sides of the attachment base and towards the mouthpiece main body when the ligature is attached to the mouthpiece, the pivot arms further supporting a pivot bar on which the lever pivots.

7. The ligature of claim 6, wherein the attachment base comprises a ring configured to fit around the mouthpiece shank, the pivot arms being coupled to opposite sides of the ring.

8. The ligature of claim 1, further comprising a lever positioning assembly configured to adjust and affix the position of the lever.

9. The ligature of claim 8, the lever positioning assembly comprising a screw threadably engaged within a threaded hole provided in the first end region of the lever, and a screw receiving surface provided in the attachment base, the screw receiving surface configured to receive a bottom end of the screw and to prevent translation motion of the screw as the screw is rotated within the threaded hole, such that rotating the screw causes the lever to pivot.

10. The method of claim 1, wherein the attachment base comprises a ring configured to fit around the mouthpiece shank.

* * * * *